(12) United States Patent
Filpo Ferreira Da Silva et al.

(10) Patent No.: US 6,507,787 B1
(45) Date of Patent: Jan. 14, 2003

(54) METHOD FOR THE SUPPRESSION OF MULTIPLE REFLECTIONS FROM MARINE SEISMIC DATA

(75) Inventors: Eduardo Filpo Ferreira Da Silva, Niterói (BR); Martin Tygel, Campinas (BR)

(73) Assignee: Petroleo Brasileiro S.A.-Petrobras, Rio de Janeiro (BR)

(*) Notice: Subject to any disclaimer, the term of this patent is extended or adjusted under 35 U.S.C. 154(b) by 0 days.

(21) Appl. No.: 09/419,769

(22) Filed: Oct. 18, 1999

(51) Int. Cl.$^7$ .............................................. G06F 19/00
(52) U.S. Cl. ............................................ 702/1; 702/14
(58) Field of Search ................. 702/1, 14, 17; 367/21

(56) References Cited

U.S. PATENT DOCUMENTS

| | | | |
|---|---|---|---|
| 4,665,510 A | | 5/1987 | Foster et al. ................... 367/21 |
| 4,682,307 A | * | 7/1987 | Newman ...................... 367/21 |
| 5,051,960 A | | 9/1991 | Levin ........................... 367/24 |
| 5,729,506 A | | 3/1998 | Dragoset, Jr. et al. ......... 367/24 |
| 6,094,620 A | * | 6/2000 | Gasparotto et al. ............ 702/14 |
| 6,101,448 A | * | 8/2000 | Ikelle et al. ................... 702/17 |

FOREIGN PATENT DOCUMENTS

| | | | | |
|---|---|---|---|---|
| EP | 1 094 339 A2 | * | 4/2001 | ............ G01V/1/36 |
| GB | 2 090 407 A | * | 7/1982 | ............ G01V/1/36 |

OTHER PUBLICATIONS

"A unified approach to 3–D seismic reflection imaging, Part 1: Basic concepts", by Peter Hubral et al., Geophysics vol. 61 No. 3, pp. 742–758 (1996).
A unified approach to 3–D seismic reflection imaging, Part II: Theory by Tygel et al., Geophysics vol. 61, No. 3, pp. 759–775 (1996).
"Pattern recognition, spatial predictability and subtraction of multiple events" by Simon Spitz, The Leading Edge, Jan. 1999, pp. 55–58.
Multiple attenuation: an overview of recent advances and the road ahead (1999) by Arthur Weglein, The Leading Edge, Jan. 1999, pp. 40–44.
"Near–offset multiple suppression" by Eduard Filpo, The Leading Edge, Jan. 1999, pp. 40–44.
"Deep–water multiple suppression in the near–offset range" by Eduardo Filpoilva et al., WEG, 69$^{th}$ Annual Meeting, Tulsa, OK, USA Oct.

* cited by examiner

*Primary Examiner*—Edward Lefkowitz
*Assistant Examiner*—Victor J. Taylor
(74) *Attorney, Agent, or Firm*—Sughrue Mion, PLLC (57) ABSTRACT

A method for the suppression of multiple reflections using a Kirchhoff algorithm Multiple reflections are simulated by means of a Kirchhoff-type summation applied to a pseudo zero-offset section. An adaptive filter is applied to adjust the simulated multiple. The adjusted simulated multiple is subtracted from the input data.

19 Claims, 12 Drawing Sheets

FIGURE 3

Input:
ZO section

FIG. 3A

Output:
Simulated Multiple section

METHOD FOR THE SUPPRESSION OF MULTIPLE REFLECTIONS FROM MARINE SEISMIC DATA

FIELD OF THE INVENTION

The present invention relates to a method for the suppression of multiple reflections from marine seismic data, more specifically, to a method for the near offset range suppression of multiple reflections where the simulation of multiple reflections by means of a Kirchhoff-type algorithm is applied to a common near-offset section. As a result, significant improvement in the seismic image is achieved.

BACKGROUND INFORMATION

Routine interpretation of processed seismic data is mainly focused on understanding primary reflections. Multiples, however, also occur in all seismic reflection data, acquired both in land and marine environments. Although multiples may bring useful data on the subsurface medium, present processing technology is still not able to make good use of this information. On the contrary, multiple arrivals are seen as undesirable events.

If not properly attenuated or removed, multiples can interfere with primary reflections, leading to difficulties in the estimation of velocities and amplitudes. In many land data cases, multiple attenuation can be adequately achieved by deconvolution and CMP stacking.

Because of the presence of strong reflections on the water-air contact (free surface), in particular sea-bottom multiple reflections, marine data most often require additional processing.

In general, methods of multiple attenuation or suppression can be divided into two categories, namely (a) filtering—based on some characteristics of the multiple energy involved and (b) prediction—simulation of multiples and subtraction from the original data. The well known Radon and f-k transform algorithms, generally applied in the CMP domain, belong to the first group. An internal mute on near offsets has to be applied, as a discrimination between primaries and multiples is more difficult in this range. Algorithms of the second category are based on wave-propagation approaches such as forward modeling or inverse scattering. These are generally expensive and require, moreover, a good estimate of the source signature for useful results.

The increasing use of seismic data in reservoir characterization, together with the large number of exploratory prospects on targets of stratigraphic nature, poses as a very desirable aim any improvement in resolution that can be achieved by seismic processing. In this context, accurate elimination of multiple reflections in near-offset range within a target region may be crucial to correctly image, say, a fine stratigraphic sequence or to derive reliable seismic attributes of a reservoir.

In the case of deep-water data, suppression of first-order sea-bottom multiple and peg-leg reflections (i.e., which reverberate only once in the water layer) is of great importance. These rather strong multiples may have the same traveltime as the primary reflections of target reflectors.

U.S. Pat. No. 4,665,510 teaches a method of attenuating multiple reflections in a conventional seismic processing flow. Predictive Deconvolution After Stack is used to reduce the multiple interference on stack velocity analysis. The Deconvolution After Stack emphasizes the primary reflections with their stack velocity ranges, and this information can aid in selecting a good multiple stack velocity for filtering in F-K domain.

U.S. Pat. No. 5,729,506 teaches a computationally economical method for applying multi-dimensional multiple-reflection attenuation to a marine seismic-signal data set comprised of a plurality of common shot sections that have surface-multiple wavefields embedded therein. A common shot section is chosen from among the plurality of common shot sections. The predicted surface-multiple wavefield nearest to the chosen common shot section is adaptively filtered to match the predicted surface-multiple wavefield to the surface-multiple wavefield embedded in the chosen common shot section. The matched predicted surface multiple wavefield is subtracted from the embedded surface multiple wavefield to provide a multiple-free common shot section.

U.S. Pat. No. 5,051,960 teaches a method of removing multiple reflection events from seismic records. A shallow primary reflection event is used as a model for a deeper primary, and is distorted responsive to the predicted static correction to yield a model for the multiple. The method is applied to a common depth point (CDP) record, in which the common-midpoint contribution of the multiple to each CDP record can be assumed to be equal. The technique taught in said US patent is applied solely to removal of multiples which arise from reflection at the surface during land exploration.

Hubral, P. et al in "A unified approach to 3-D seismic reflection imaging. Part I: Basic Concepts", Geophysics vol. 61 n° 3 p.742–758 (1996) state that the basic idea of the unified approach is to cascade Kirchhoff migration and demigration integrals to solve a variety of seismic imaging problems. The application of both integrals in sequence leads to weighted summation along certain stacking surfaces. This kind of algorithm is known in the technique as a Kirchhoff-type algorithm. The present invention teaches one possible application of the principles discussed in said article.

Tygel, M. et al. in "A unified approach to 3-D seismic reflection imaging. Part II: Theory", Geophysics vol. 61 n° 3 p. 759–775 (1996) discuss the theoretical principles stated in Part I of the article.

Weglein, A. B, in "Multiple attenuation: an overview of recent advances and the road ahead (1999)", The Leading Edge, January 1999, pages 40–44, presents an overview of the current state of multiple attenuation as well as recent advances in the field. Filtering as well as prediction methods such as wavefield prediction and subtraction, wavefield extrapolation, free-surface multiple elimination, feedback and inverse-scattering methods are discussed.

Filpo Ferreira da Silva, E. and Tygel, M., in "Deep-water multiple suppression in the near-offset range"—The Leading Edge, January 1999, pages 81–84, present a method to suppress first-order and peg-leg multiples in deep-water marine data. The main steps are: i) simulation of multiples by means of a weighted Kirchhoff-type summation applied to a stacked section; ii) application of an adaptive filter to adjust the simulated multiple; and iii) subtraction of the adjusted multiple from the original data. Advantageously, the technique has no limitations on short offsets and no requirement to estimate source wavelets and reflection coefficients.

Spitz, S., in "Pattern recognition, spatial predictability, and subtraction of multiple events", The Leading Edge, January 1999, page 55 to 58, discusses the extraction of simulated or modeled multiples from the original data set, which corresponds to step iii) of the method described by Filpo Ferreira da Silva and Tygel M. in the previous paragraph. In this article Spitz shows that the subtraction methodology is mainly concerned with the shapes of the events.

Filpo Ferreira da Silva, E. and Tygel, M., in "Near-offset multiple suppression", Society of Exploration Geophysicists (SEG), Sixty-ninth Annual Meeting, Tulsa, USA, Oct. 31–Nov. 5, 1999, describe a simulation method to effect a transformation of a given common near-offset or stacked input section (taken as an approximation of a zero-offset section and containing all primaries and multiples), into a corresponding output section that solely consists of the multiples to be suppressed.

SUMMARY OF THE INVENTION

Broadly, the main steps of the application of the method are i) simulation of multiple reflections by means of a Kirchhoff-type summation applied to a pseudo zero-offset section. As explained hereinbefore, this is an input common near-offset of stacked section that is taken as an approximation of a zero-offset section; ii) application of an adaptive filter to adjust the simulated multiple reflections and iii) subtraction of the obtained adjusted simulated multiple reflection from the original data.

In the present invention, steps ii) and iii) are carried out according to state-of-the-art principles.

Thus, the present invention provides a method for the suppression of multiples with the aid of a Kirchhoff algorithm.

The present invention provides further a method where the suppression of multiples may be applied to the near-offset range.

The present invention provides still a method for the suppression of multiples which may be applied to multiples generated by sea bottoms of any dips.

The present invention is based on theoretical principles which lead to a simulation of multiples in a 3-D environment even when using streamer data.

BRIEF DESCRIPTION OF THE DRAWINGS

FIG. 12A is a zoom view of FIG. 11 before applying the method of the invention while

DETAILED DESCRIPTION OF THE PREFERRED EMBODIMENTS

Broadly, the method of the present invention teaches an accurate and efficient scheme to simulate free-surface multiples out of a zero-offset (or input) section (including primaries and multiples). A reasonable approximation of the original zero-offset section can be a short-offset or a CMP-stacked section.

Thus, the main steps of the inventive method are i) simulation of multiple reflections by means of a Kirchhoff-type summation applied to a pseudo zero-offset section; ii) application of an adaptive filter to adjust the simulated multiple and iii) subtraction of the obtained adjusted multiple reflection from the pseudo zero offset section. FIGS. 1A to 1D and FIG. 2 illustrate said main steps.

In the present specification, the expression "pseudo zero off section" means a section that contains all primaries and multiples and can serve as a good approximation of a zero offset section. For example, a common offset section transformed into a zero offset section or a stack section.

The application of the present method leads to a weighted Kirchhoff-type stack which, applied to the pseudo zero-offset section, performs the task of transforming an input zero-offset section, that comprises primaries and multiples, into an output simulated section in which all original primary reflections have been transformed into their corresponding, free-surface multiples.

It should be noted that the weight function that is to be applied in the present Kirchhoff-type method can be chosen so that the resulting amplitudes of the multiples well approximate their observed values. The use of this weight function should provide improved initial amplitudes prior to the application of the filtering procedures.

Thus, the simulation method described in the present application is designed to effect a transformation of a given common near-offset or stacked input section (the input pseudo zero-offset section), into a corresponding output section that solely consists of the multiples to be suppressed. As state before, the input pseudo zero-offset section is taken as an approximation of a zero-offset section and containing all primaries and multiples.

Figure 1A:
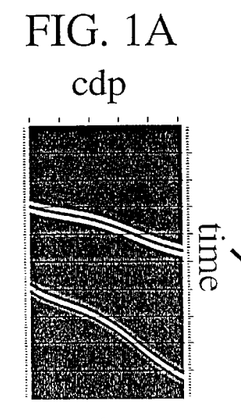
FIGS. 1A to 1D illustrates the method of the present invention, in graphical form.
Figure 1B:
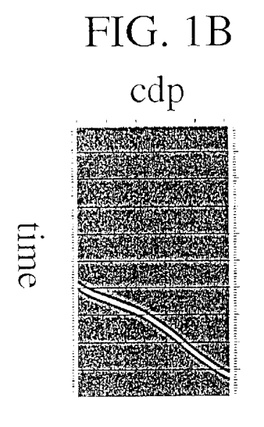
Figure 1C:
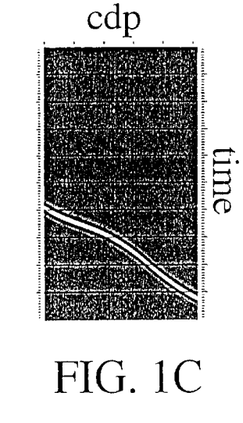
Figure 1D:
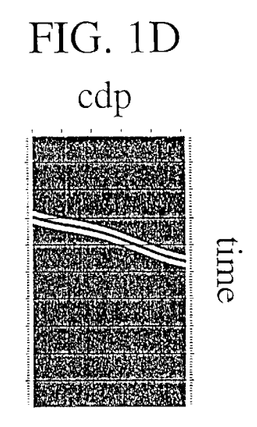
Figure 2:
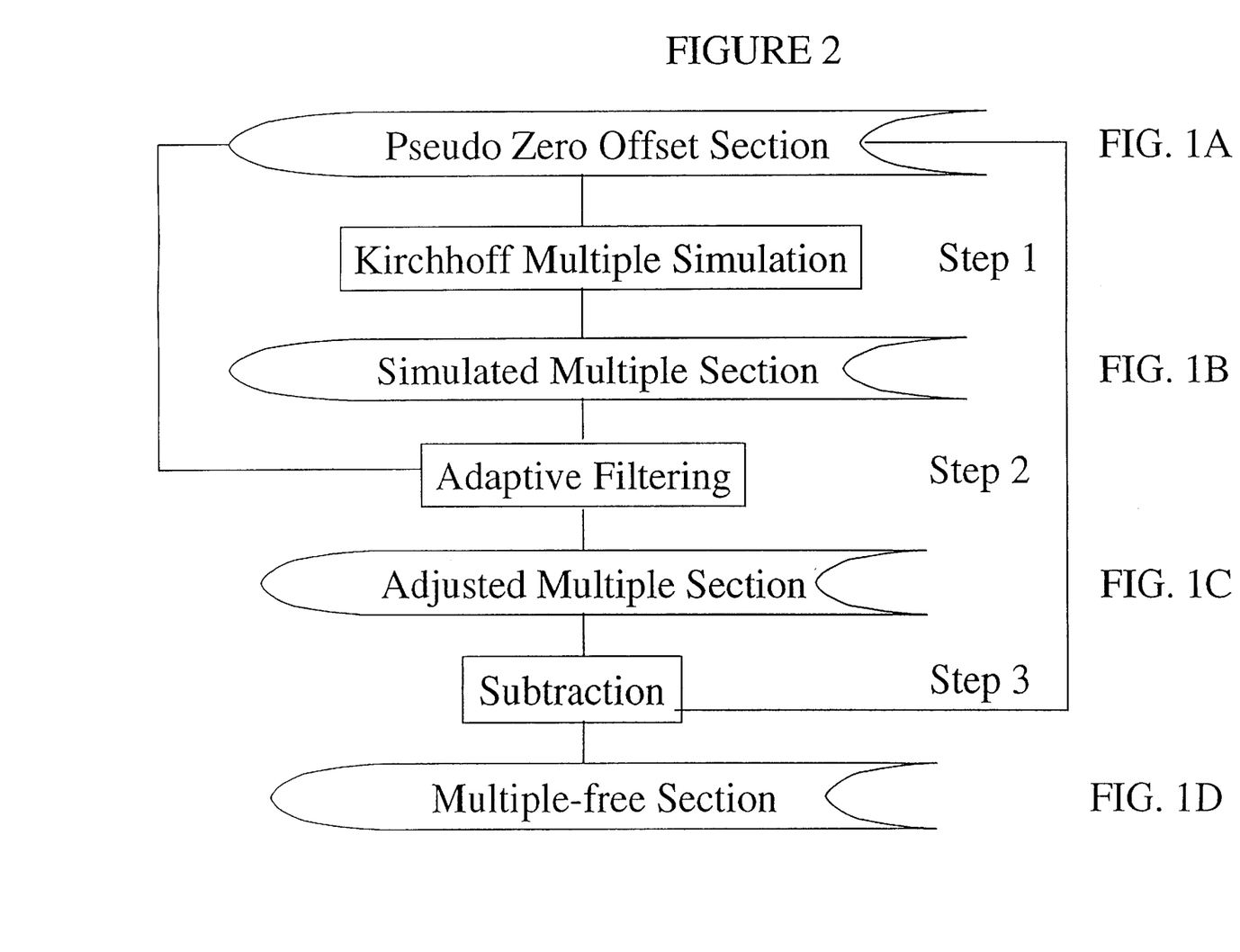
FIG. 2 illustrates the method of the present invention as a flow sheet, with each corresponding step of FIG. 1 being indicated.
Figure 3A:
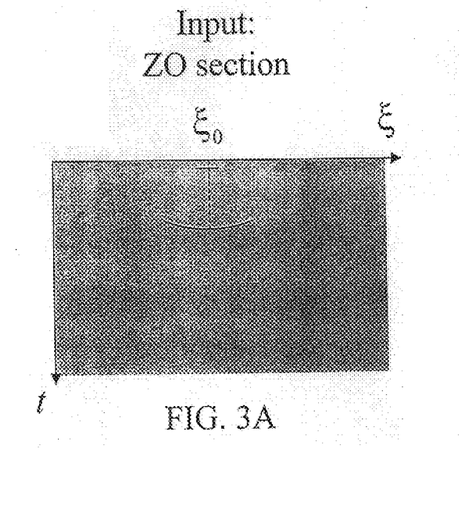
FIG. 3 illustrates the Kirchhoff method of multiple simulation.
Figure 3B:
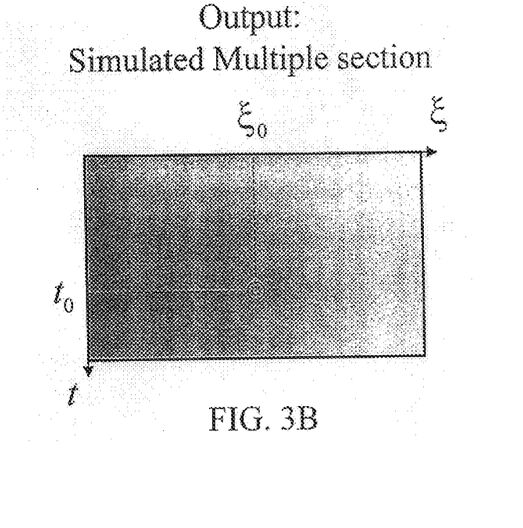

According to the illustration of FIG. 3, in a Kirchhoff-type stacking algorithm, for example a Kirchhoff simulation of multiple reflections, each sample of the output section (that is, the simulated multiple section) is the result of a sum of samples collected along a uniquely specified curve in the input section (the pseudo zero offset section). This curve is generically called the stacking line. The input samples along the stacking line are multiplied by certain weights, also determined by the sample in the output section, where the resulting sum is to be placed. The terminology "weight function" is employed to refer to the choice of multipliers that are used in the summation process, which in turn is called a weighted Kirchhoff stack. In symbols, the Kirchhoff-type transformation can be written $$U_0(\xi_0, t_0) = \frac{1}{\sqrt{2\pi}} \int d\xi \, W(\xi; \xi_0, t_0) D_t[U(\xi, t)]\bigg|_{t=\tau(\xi,\xi_0,t_0)} \quad (1)$$

Wherein the following notation has been used ($\xi_0, t_0$) is the midpoint and traveltime coordinates of the output point in the simulated section of multiples;

$U_0(\xi_0,t_0)$ is the amplitude resulting from the application of the algorithm to be placed at the point $(\xi_0,t_0)$ in the output section;

$(\xi,t)$ is the midpoint and traveltime coordinates of the points in the input pseudo zero offset section;

$U(\xi,t)$ is the amplitude at the point $(\xi,t)$ in the input section;

$W(\xi;\xi_0,t_0)$ is the weight function;

$\tau(\xi;\xi_0,t_0)$ is the stacking line;

$D_t[U(\xi,t)]$ is the Hilbert transform of the temporal half derivative of $U(\xi,t)$.

The crucial step in any Kirchhoff-type summation algorithm is the construction of stacking lines and weight functions. This also applies to the present simulation scheme, with the exception that weights are not so crucial due to the further application of an adaptive filter to adjust amplitudes and phases. The use of adaptive techniques to match discrepancies between predicted and observed multiples is a common procedure in schemes of multiple attenuation.

For a fixed point $(\xi_0,t_0)$ in the output section, the expression of the corresponding stacking line drawn in the input section can be shown to be as stated in equations (2), (3) and (4) below:

$$t = \tau(\xi;\xi_0,t_0) = \frac{t_0}{2}(1-\mu^2)\sqrt{1+\mu^2} \quad \text{where} \tag{2}$$

$$\mu = -\frac{2\sqrt{3}}{3}\sinh\left(\frac{\phi}{3}\right) \quad \text{in which} \tag{3}$$

$$\phi = \sinh^{-1}\left(6\sqrt{3}\frac{\xi-\xi_0}{vt}\right) \tag{4}$$

v being the p-wave velocity propagation.

The above formula is an exact traveltime description of the first-order sea-bottom multiple in the zero-offset situation. It provides also a good approximation of the traveltimes of corresponding near sea-bottom peg-leg multiples.

The simulation of the correct amplitude and pulse shape of the multiples to be suppressed can be theoretically achieved by the introduction of weights in the Kirchhoff-type stacking integral of equation (1). These weights depend, however, on the reflection coefficients and incident angles of the multiples to be suppressed. As these quantities are not known, it is much more practical to effect the necessary amplitude adjustments upon the use of adaptive filtering techniques. This procedure is also helpful in handling peg-leg multiples.

The simulation of a multiple reflection can be achieved by a cascaded application of Migration and Demigration processes. First, the pseudo zero-offset section is migrated to the depth domain. Next, the obtained depth section is demigrated back to time domain so as to obtain the simulated multiple section.

Thus, the zero-offset Kirchhoff migration is performed by the integral as in equation (5):

$$V(x,z) = \frac{1}{\sqrt{2\pi}}\int_{A_M} d\xi\, W_M(\xi,x,z)D_t[U(\xi,t)]\Big|_{t=\tau_M(\xi;x,z)} \tag{5}$$

Wherein the following notation has been used:

$A_M$ is the migration aperture;

(x,z) is the spatial coordinates of the output point in the depth migrated section;

V(x,z) is the amplitude resulting from the application of the depth migration algorithm to be placed at the point (x,z) in the output migrated section;

$(\xi,t)$ is the midpoint and traveltime coordinates of the points in the input pseudo zero offset section;

$U(\xi,t)$ is the amplitude at the point $(\xi,t)$ in the input section;

$W_M(\xi;x,z)$ is the weight function of the migration algorithm;

$\tau_M(\xi;x,z)$ is the stacking line of the migration algorithm;

$D_t[U(\xi,t)]$ is the Hilbert transform of the temporal half derivative of $U(\xi,t)$.

The stacking line $\tau_M(\xi;x,z)$ in the migration algorithm is given by equation (6)

$$\tau_M(\xi;x,z) = \frac{2}{v}\sqrt{(x-\xi)^2 - z^2} \tag{6}$$

The weight function $W_M(\xi;x,z)$ in the migration algorithm is taken as unitary in this procedure.

The zero offset Kirchhoff demigration algorithm used to obtain the multiple section is performed by the integral (7)

$$U(\xi_0,t_0) = \frac{1}{\sqrt{2\pi}}\int_{A_D} dx\, W_D(x;\xi_0,t_0)D_z[V(x,z)]\Big|_{z=\zeta_D(x;\xi_0,t_0)} \tag{7}$$

wherein $A_D$ is the demigration aperture;

$(\xi_0,t_0)$ is the midpoint and traveltime coordinates of the output point in the demigrated section, which corresponds to the simulated multiple section;

$U(\xi_0,t_0)$ is the amplitude resulting from the application of the demigration algorithm to be placed at the point $(\xi_0,t_0)$ in the output demigrated section;

(x,z) are the spatial coordinates of the points in the input depth migrated section;

V(x,z) is the amplitude at the point (x,z) in the input depth migrated section;

$W_D(x,\xi_0,t_0)$ is the weight function of the demigration algorithm;

$\zeta_D(x,\xi_0,t_0)$ is the stacking line of the demigration algorithm;

$D_z[V(x,z)]$ is the Hilbert transform of the depth half derivative of V(x,z).

The stacking line $\zeta_D(x,\xi_0,t_0)$ in the demigration algorithm is given by equation (8)

$$\zeta_D(x;\xi_0,t_0) = \frac{vt_0}{4} - \frac{(x-\xi_0)^2}{vt_0}. \tag{8}$$

The weight function $W_D(x,\xi_0,t_0)$ in the demigration algorithm is also taken as unitary in this procedure.

As illustrated in FIGS. 4, 5, 6 and 7, an ensemble of common offset sections is made up of several sections, each section being made up of several seismic traces registered with the same distance between source and receiver. As well known by the experts, the distance between source and receiver is designed by the expression "offset", such expression being used hereinbelow. The several sections are organized in increasing order of offset or distance, from the shortest to the largest offset.

Figure 4:
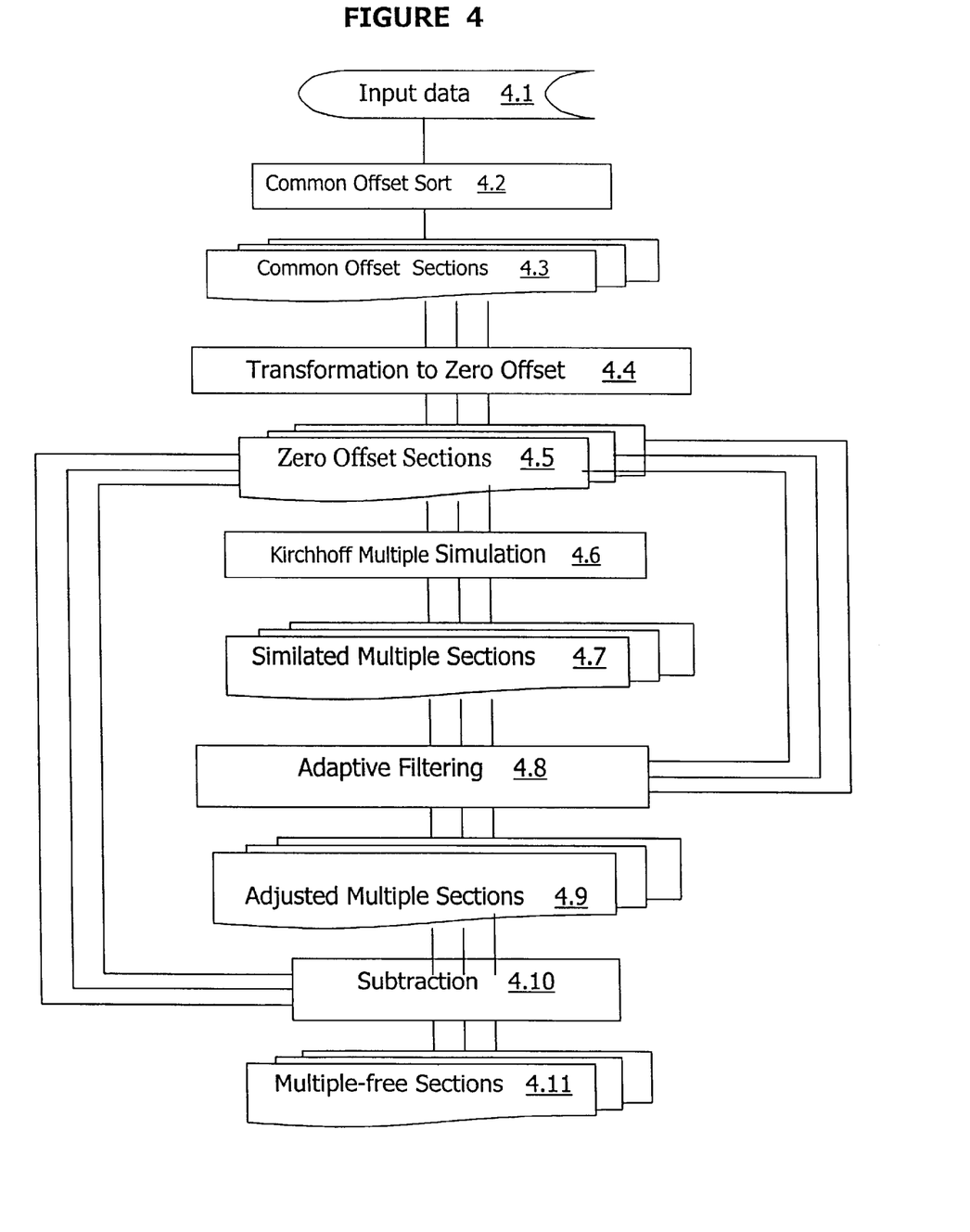
FIG. 4 illustrates an embodiment of the method of the invention for the suppression of multiples.

In one embodiment, as illustrated in the flow sheet of FIG. 4, the method of the invention for the suppression of multiple reflections from a marine seismic data set having registered primary and multiple reflections comprises the following steps:

a) sorting said input data 4.1 set so as to obtain an ensemble of common offset sections 4.2;

b) transforming each of said common-offset section 4.3 into a zero offset section, so as to obtain an ensemble of zero-offset sections 4.4;

c) by means of a Kirchhoff algorithm for simulation of multiple reflections 4.5, using each of said zero-offset sections to generate a new zero-offset section which only contains simulated, multiple reflections, that is, an ensemble of simulated multiple sections 4.6;

d) by filtering 4.7, adjusting amplitude, frequency and phase of each of the so-obtained simulated multiple sections to each corresponding zero offset section of step b), so as to generate an ensemble of adjusted multiple sections 4.8 having amplitude, frequency and phase compatible with the registered multiple reflection;

e) from each section of the ensemble of the zero-offset sections of b), subtracting 4.9 the corresponding adjusted multiple section of d), so as to obtain an ensemble of multiple-free sections 4.10.

Figure 5:
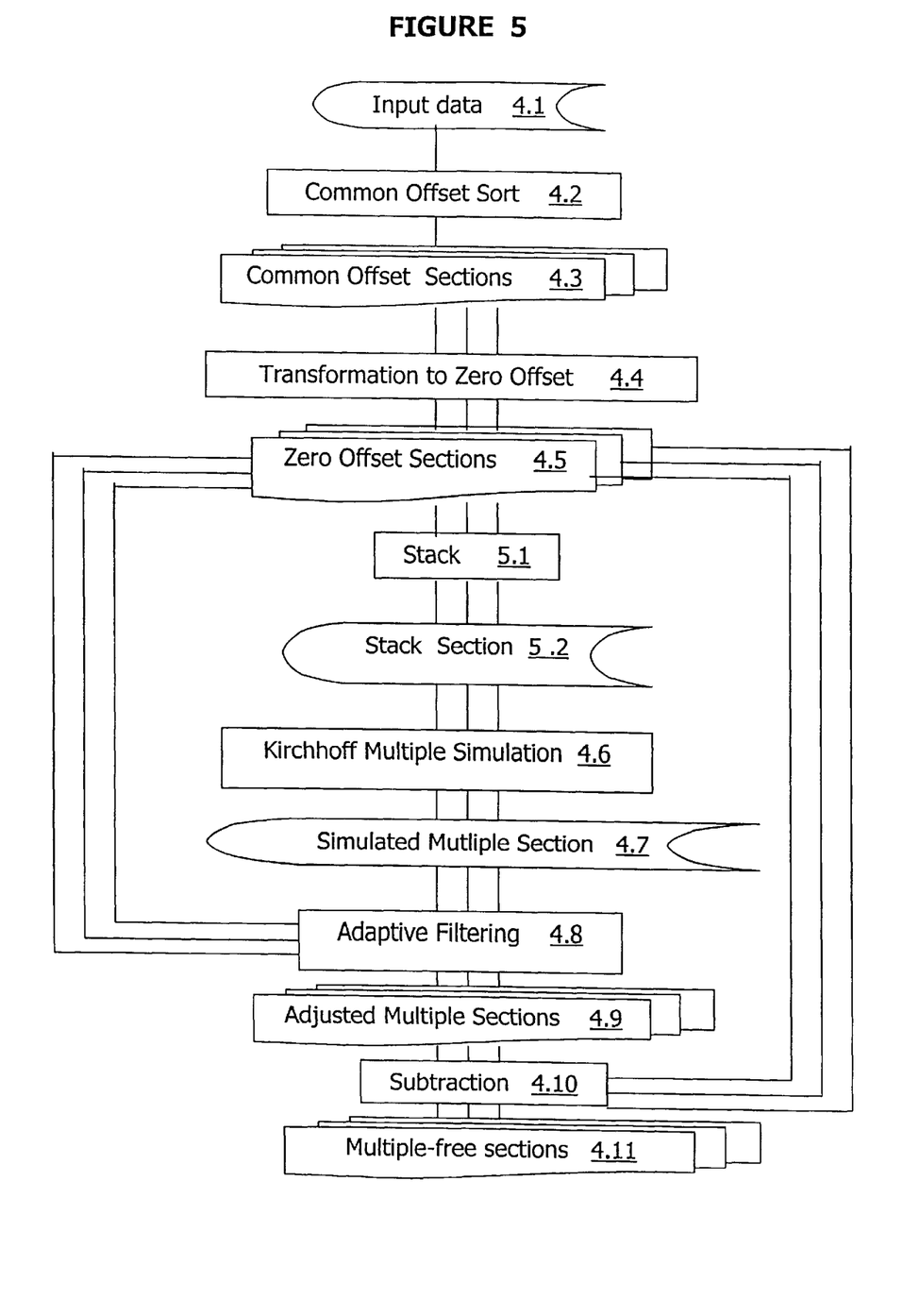
FIG. 5 illustrates another embodiment of the method of the invention for the suppression of multiples.

According to a second embodiment, as illustrated in FIG. 5, steps c) and d) are modified in the following way:

c) stacking 5.1 a sorted subset of the ensemble of zero offset sections of step b) so as to generate a single stack section (pseudo zero offset section) 5.2, which is used as input to the Kirchhoff algorithm for simulation of multiple reflections, so as to generate a single simulated multiple section;

d) by filtering, adjusting the amplitude, frequency and phase of the so-generated single simulated multiple section to each section of the zero offset sections ensemble of step b) so as to generate an ensemble of adjusted multiple sections.

It should be understood that in the first two embodiments of the present invention, the process flow as represented by FIGS. 4 and 5 is applied in such a way that the adjusted multiple which is obtained for a certain common offset section is used only as input for the subtraction step, without any further use in other common offset sections.

On the contrary, in the third embodiment of the present method, the process flow is applied in such a way that the adjusted multiple which is obtained for a certain common offset section is used as input for the nearest common offset section.

Thus, the third embodiment of the present method involves choosing the common offset section having the shortest offset after the transformation of said common offset section to zero offset. The transformed common offset section having the shortest offset is thus considered as the first zero offset section. The reason for the choice of the shortest offset is that it has undergone the least transformation and therefore the highest possible accuracy may be obtained by applying the zero offset transformation.

Figure 6:
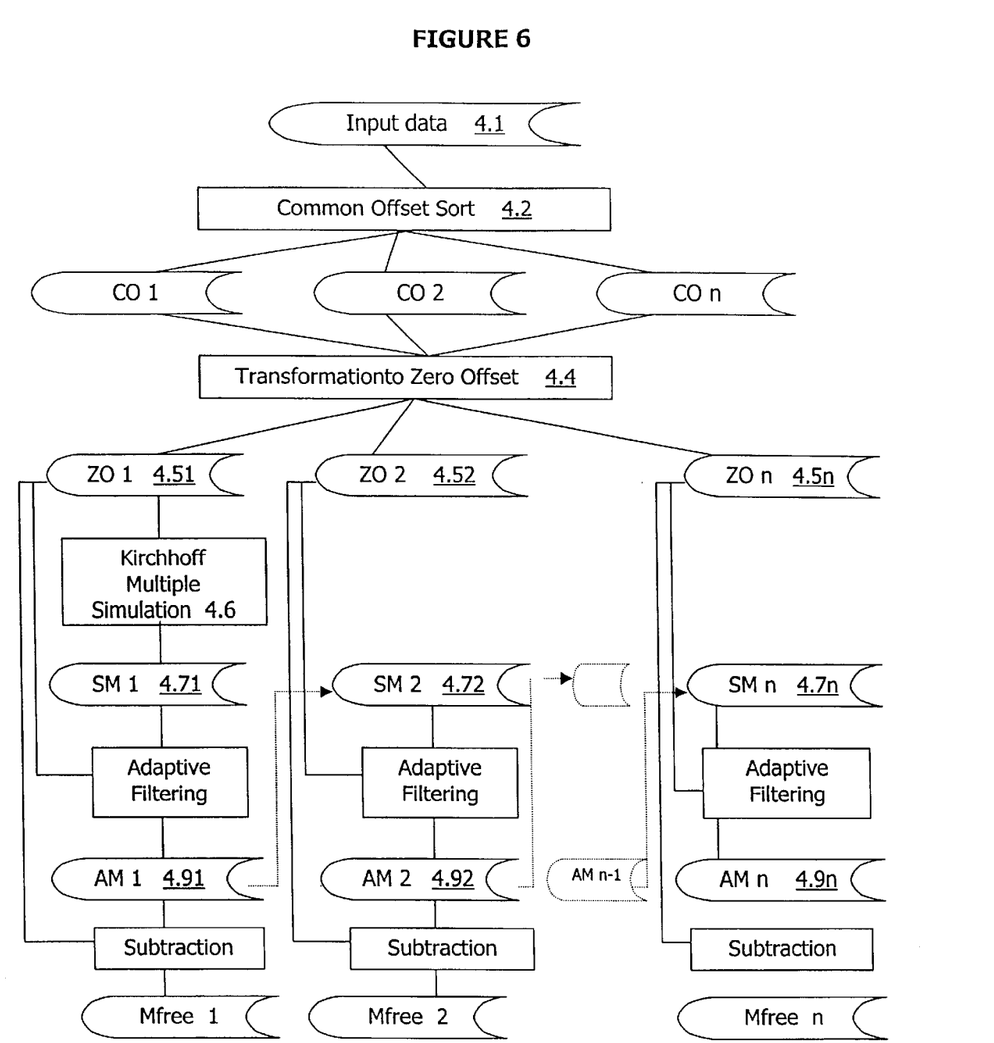
FIG. 6 illustrates a further embodiment of the method of the invention for the suppression of multiples.

According to a third embodiment, as illustrated in FIG. 6, step c) and d) are modified in the following way:

c) from the ensemble of zero offset (ZO) sections, sorting the first zero-offset section 4.51, which is used as input to the Kirchoff algorithm for simulation of multiple reflections, so as to generate a first simulated multiple (SM) section 4.71;

d) by filtering, adjusting the amplitude, frequency and phase of the so-generated simulated multiple section to the first zero offset section so as to generate the adjusted multiple (AM) section corresponding to the first common offset section 4.91, said adjusted multiple section playing the role of simulated multiple section 44.72 for the following, second common offset section, and successively to all sorted common offset sections.

The three embodiments described above consist in the application of the method of the invention to common offset sections.

For those above embodiments, on attaining the final stage of the method, that is, the multiple-free section, a further, state-of-the-art step may be applied to the obtained multiple-free, that is, to apply the inverse zero-offset transformation. Such inverse transformation means the inverse NMO correction, the inverse NMO+DMO correction or the inverse MZO process. This means that the source-receiver configuration is recovered, as it was at the stage of common offset sections.

Figure 7:
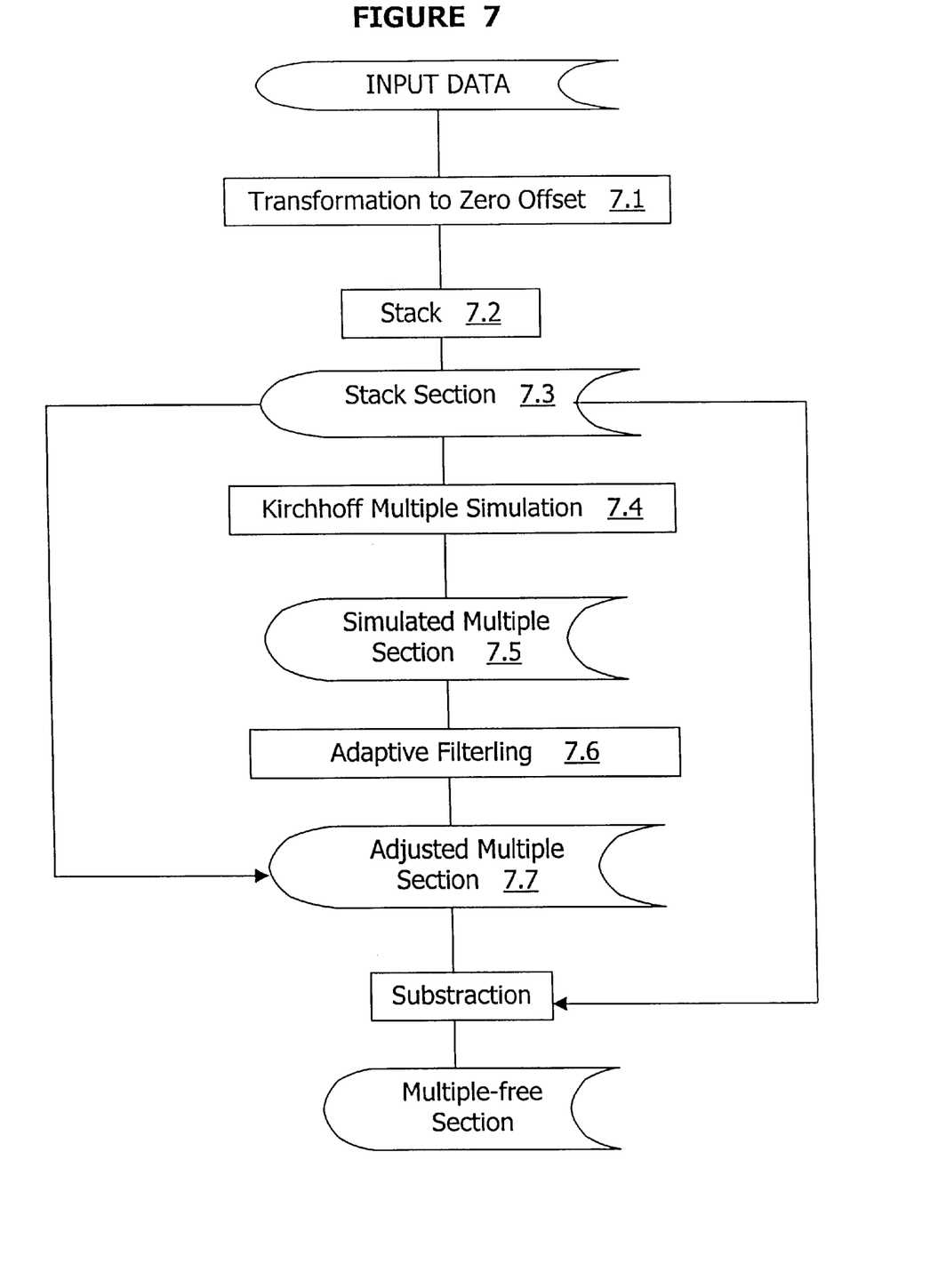
FIG. 7 illustrates a still further embodiment of the method of the invention for the suppression of multiples.

Another, fourth possible embodiment is the application of the present method on stack data. Said embodiment comprises the following steps, as illustrated in FIG. 7 attached:

a) applying a proper zero offset transformation 7.1 and stacking 7.2 the obtained data in order to generate a stack section 7.3;

b) using the so-generated stack section as an input to the Kirchhoff method for multiple simulation 7.4, obtaining a zero offset simulated multiple section 7.5;

c) by filtering 7.6, adjusting amplitude, frequency and phase of the so-obtained zero offset simulated multiple section, so as to generate a multiple section of amplitude, frequency and phase compatible with the registered multiple reflections, that is, an adjusted multiple section 7.7;

d) from the zero-offset section (stack section) of a), subtracting 7.8 the corresponding adjusted multiple section of c), so as to obtain a multiple-free section 7.9.

For all described embodiments. the transformation to Zero offset can be performed by applying (i) NMO correction;

(ii) NMO+DMO correction;

(iii) or MZO process wherein NMO means Normal Moveout, DMO means Dip Moveout and MZO is Migration to Zero Offset.

The filtering process is carried out according to the usual way, that is by generating a matching filter using the simulated multiple reflection as input and the observed multiple as desired output. The simulated multiple is found at the simulated multiple section while the observed multiple is contained at the zero-offset section. The aim of the filtering is the matching of the simulated multiple reflections to the observed multiple reflections.

The filtering step may be performed in several alternative ways, such as:

i) by using a single matching filter for the whole section ii) by using a set of matching filters, each filter being applied to a portion of the adjusted multiple section;

iii) by using a single matching filter for the whole section, effecting filtering and subtraction at the same step;

iv) by using a set of matching filters, each filter being applied to a portion of the adjusted multiple section, effecting filtering and subtraction at the same step.

The inventive method of multiple simulation using a Kirchhoff algorithm can be performed either:

(i) using equations (1) to (4). It comprises then a summation of figures collected along a stacking line on input data such as the pseudo zero offset section;

(ii) or using equations (5) to (8). It comprises then a) migrating input data to depth domain so as to obtain a migrated section and b) demigrating the so-obtained migrated section so as to obtain a simulated multiple section.

The examples of the present invention have been obtained by applying the method of the invention in one single step. However, the same or different examples may be obtained by applying the two-step approach.

The present invention will now be illustrated by the following Examples, which should not be construed as limiting the Invention.

EXAMPLE 1

The Example corresponds to the application of the inventive method to a PETROBRAS offshore 2-D seismic line recorded at Brazilian continental margin. In the region under investigation, average sea-floor depths are 1,500 m, dips varying up to 5.2 degrees. The main parameters relative to the acquisition geometry and processing are displayed in Table 1 below.

TABLE 1

| | |
|---|---|
| Interval between shots | 26.67 m |
| Interval between receivers | 26.67 m |
| Interval between CMPs | 26.67 m |
| Sampling interval | 2 ms |
| Processed record time | 6.0 s |
| Minimum offset | 218 m |
| Maximum offset | 4191.83 |

Figure 8:
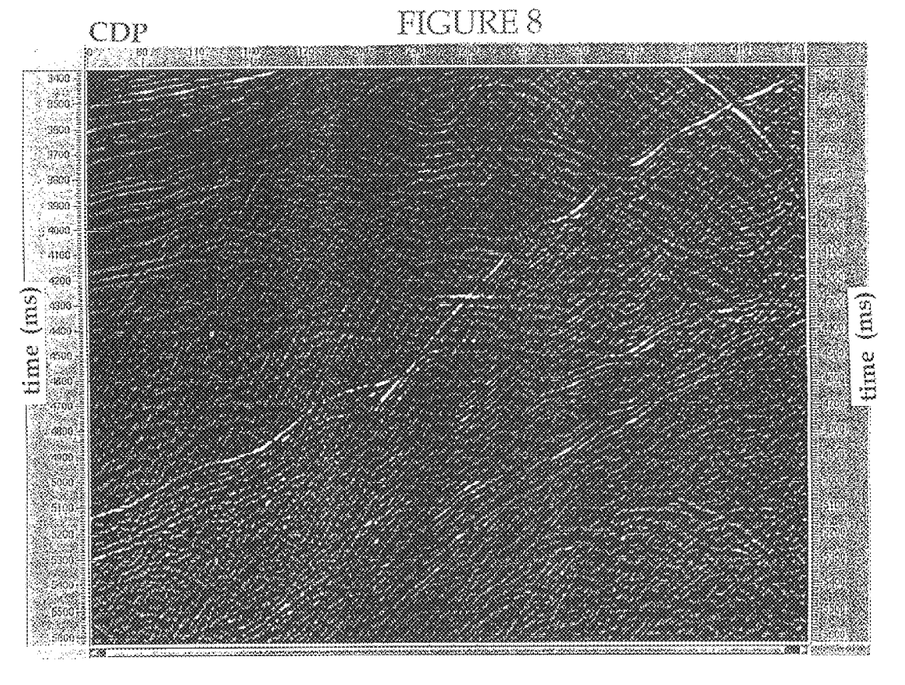
FIG. 8 is an example of a seismic section where a target horizon is affected by a multiple reflection.

FIG. 8 shows a portion of a stacked section of the whole seismic line to which the method has been applied.

Figure 9:
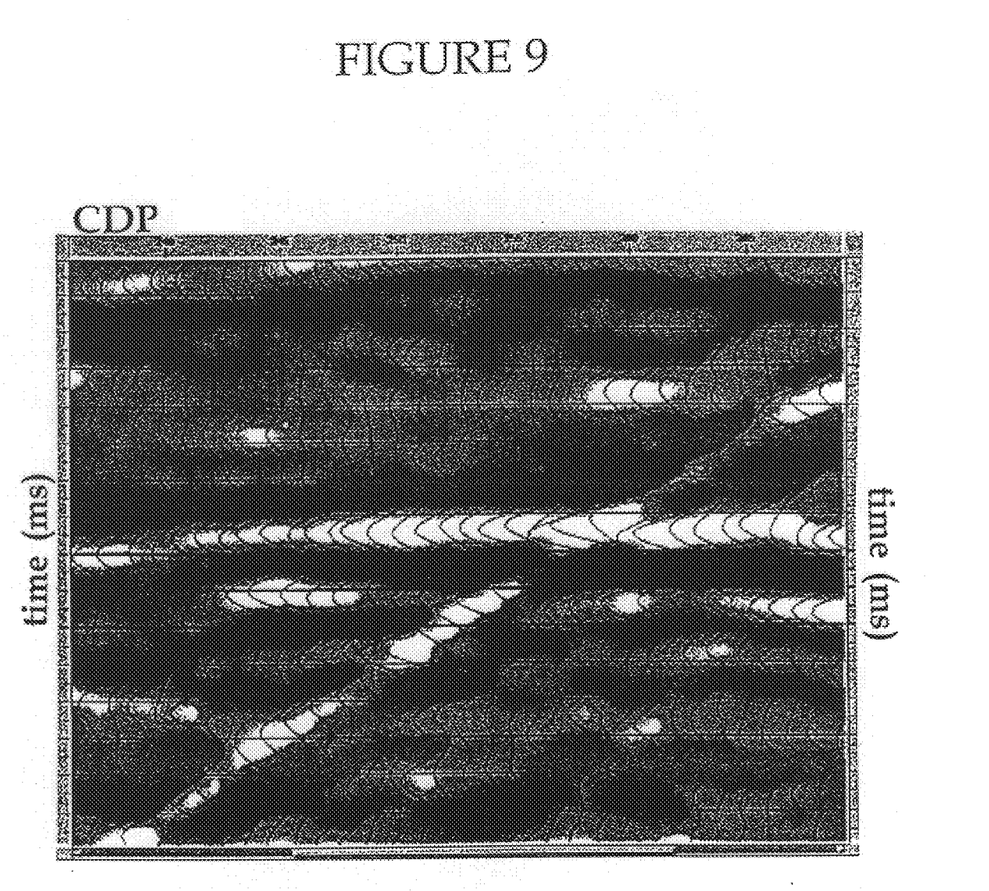
FIG. 9 a zoom view of the target horizon of FIG. 7.

The available data set consisted of an ensemble of common-offset sections, each of which having been subjected to a whole pre-stack processing sequence, which included conventional multiple attenuation using F-K methods. FIG. 8 shows a stack of 22 common-offset sections with offsets up to 778 m. Examination of the common offset section shows that, in the considered small-offset range, the F-K method has not been able to correctly attenuate, free-surface multiples. Note, for example, that sea-bottom multiples can be clearly observed at times greater than 3.2 s and strongly interfere with primary reflections. As an example, FIG. 9 readily shows a primary reflection being cut by the sea bottom multiple. This could be an important target event for which a clear image would be needed. Therefore, the successful withdrawal of said residual multiples from the ensemble of small-offset sections would demonstrate the excellence of the proposed algorithm as an adequate tool in the suppression of multiples.

To carry out the actual multiple suppression from the given data, the following strategy has been employed:

a) the input data set was sorted into an ensemble of common-offset sections;

b) all sections of said ensemble were NMO corrected using the constant velocity of water. The NMO-corrected section obtained from the common-offset section of shortest offset has been chosen to be the best approximation of a zero-offset section. Note that this choice is not unique. An alternative for said best zero-offset approximation could be, for instance, a stacked section of a number of previously NMO-corrected sections;

c) the Kirchhoff-type summation algorithm is then applied to the above approximated zero-offset section to simulate a section of zero-offset multiples, honoring, basically, traveltimes;

d) by means of an adaptive filter, automatically matching amplitudes, frequency and phase of the above-simulated multiples to the corresponding ones of the observed multiples so as to yield a new updated section of simulated multiples, now honoring traveltime and amplitude requirements;

e) subtracting the previous section of simulated multiples from the input section to produce a new, free-multiple section;

f) the simulated multiples in section (d) were considered as an initial simulation of the multiples with respect to the next NMO-corrected sections obtained from the original data. Analogous application of the adaptive filter was carried out on these multiples to match their amplitudes and phases to the corresponding ones pertaining to the new input section. The obtained section of simulated multiples was subtracted from the input section to produce its corresponding free-multiple section;

g) the process was repeated to all common-offset sections under consideration;

h) finally, each common-offset section was subjected to an inverse NMO correction and, hence, prepared for the next processing steps such as stacking or pre-stack migration.

Figure 10:
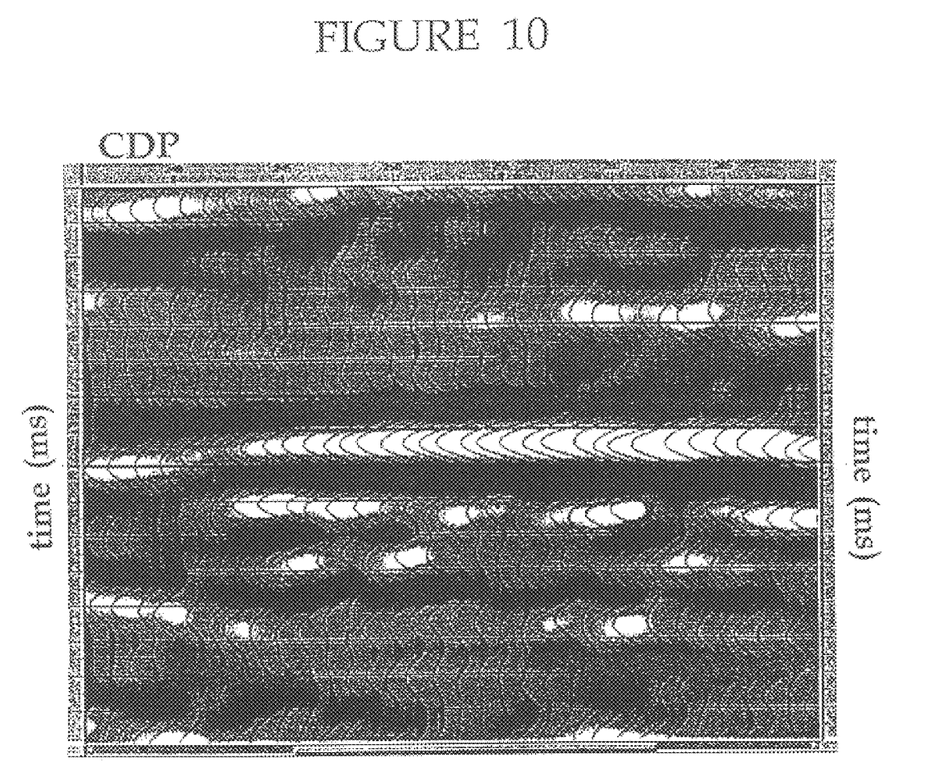
FIG. 10 is FIG. 9 after applying the present method for the suppression of multiples.

Note in FIG. 10 the complete suppression of the sea-bottom multiple. The success of the application of the algorithm according to the method of the invention in suppressing the sea-bottom multiple from the target reflection and leading to a very clean image may thus be demonstrated.

EXAMPLE 2

Example 2 corresponds to the application of the method of the invention on stack section extracted from a 3D seismic volume. The main acquisition and processing parameters of the selected line are presented in Table 2 below.

TABLE 2

| | |
|---|---|
| Interval between shots | 25.00 m |
| Interval between receivers | 12.50 m |
| Interval between CMPs | 6.25 m |
| Sampling interval | 2 ms |
| Processed record time | 4.0 s |
| Minimum offset | 148.00 m |
| Maximum offset | 235,50 m |

The strategy used in this case is described in the following steps:

a) stacking the selected data after the application of the NMO correction using the water velocity;

b) using the stack section to simulate multiples by means of the Kirchhoff summation, generating the simulated multiple section;

c) adjusting and subtracting the simulated multiple section from the stack section, so as to generate a new multiple-free stack section.

Figure 11:
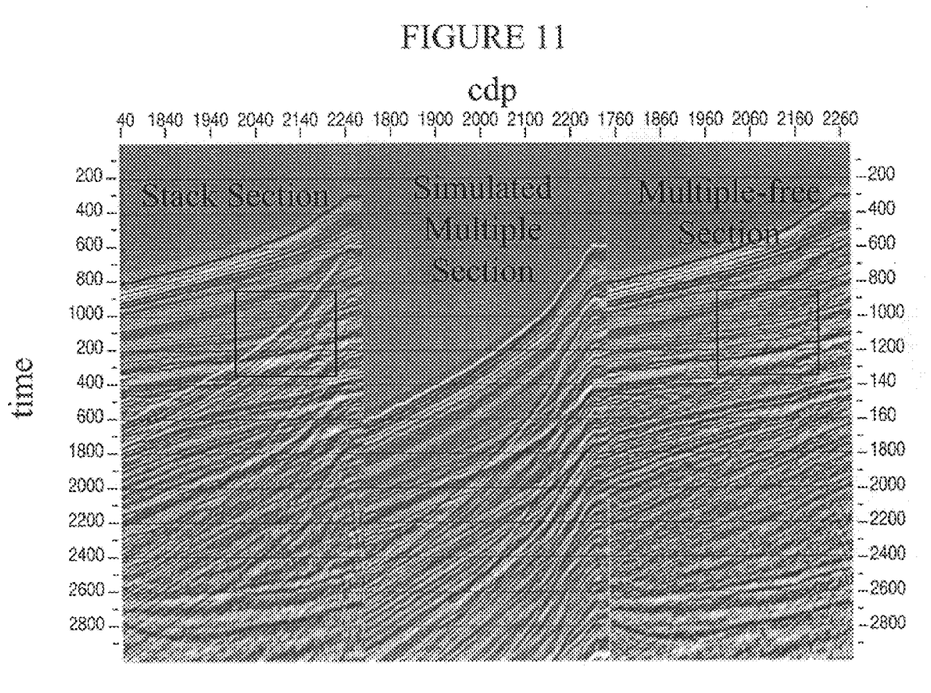
FIG. 11 is an illustration of the method of the invention on a stack section.
Figure 12A:
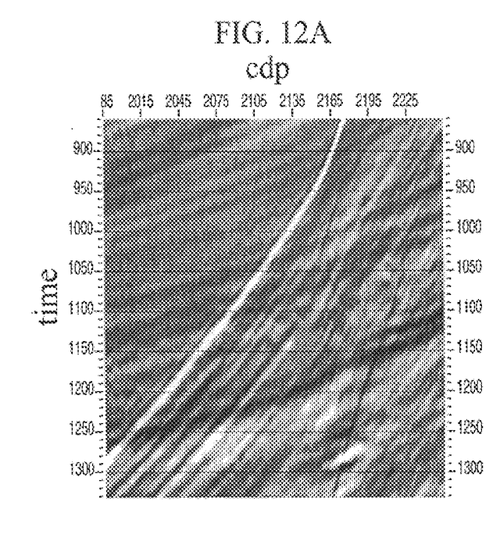
Figure 12B:
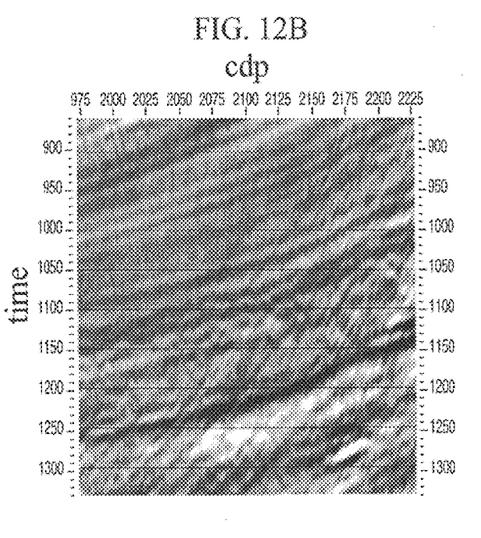
FIG. 12B is a zoom view of FIG. 11 after applying the method of the invention.

FIG. 11 presents the results generated after each one of the three steps described above. FIGS. 12A and 12B show the zoom images of FIG. 11. FIG. 12A shows the stack section before the application of the method while FIG. 12B shows the same stack section after the successful suppression of the multiples resulting from the application of the inventive method.

The Kirchhoff simulation used in the present invention presents the following main advantages: i) it is target oriented, that is, it can be applied to a definite, constrained region, using rays that illuminate this region only; ii) it leads to very fast and robust algorithms, at least on simple models such as constant velocity; iii) it does not require spatially equal sampling and therefore may be used for 2-D as well as conventional 3-D streamer data; iv) there is no dip limitation for multiple simulation and v) it does not require an estimate of the source signature.

Interestingly, U.S. Pat. No. 5,729,506, column 3 lines 7–14 states that the method outlined therein is satisfactory for use in regions where the line of profile is aligned substantially in the direction of maximum dip and provided both primary reflections and multiple reflections are present and are recorded. This constitutes a limitation of the method since in the absence of the required condition, the obtained results will be impaired. The present method does not present such limitation since the background theory does not contain restrictive premises so that the method may be applied to simulate multiples in a 3-D environment.

Further, contrary to the teachings of the state-of-the-art technique, as expressed for example in U.S. Pat. No. 5,729,506 (see for example column 2 lines 63–64) and U.S. Pat. No. 5,587,965, which state that such technique involves an initial estimate of the source wavelet, the present method dispenses with such estimate.

In the specification and claims of the present invention the Applicant has used the term "Kirchhoff algorithm" or "Kirchhoff method" by analogy to well known Kirchhoff migration methods. However, the analogy of the simulation method developed by the Applicant and the state-of-the-art methods relates only to the summation aspect while all other aspects have been specifically developed for the multiple simulation.

The present invention treats the problem of multiple simulation as an imaging problem, based on the general principles stated in the article by Hubral et al, mentioned hereinbefore.

The inventive method is expected to work well on any seismic section that can be a reasonably approximation of a zero-offset section. Very good results were obtained by applying the algorithm to deep-water, short-offset sections. As most available multiple suppression methods fail exactly on the near-offset range, the present scheme can be an alternative in this important range.

Further, the present method may be applied to a migrated section. In this case, the simulated multiple from pseudo zero-offset section needs to be subjected to the same migration procedure as the one applied to the data.

Thus, the specification and attached Figures demonstrate that the present method allows the use of near-offset section, close to the source, this possibility being not described nor suggested in the open literature. The images generated by these near-offset sections are better resolved than the state-of-the-art images.

What is claimed is:

1. A method for the suppression of multiple reflections from a marine seismic data set having registered primary and multiple reflections, comprising:
   a) sorting said input data set so as to obtain an ensemble of common offset sections
   b) transforming each of said common-offset sections into a zero offset section, to obtain an ensemble of zero-offset sections;
   c) by means of a Kirchhoff algorithm for simulation of multiple reflections, using each of said obtained zero-offset sections to generate a new zero-offset section which only contains simulated, multiple reflections each, to form an ensemble of simulated multiple sections;
   d) by filtering, adjusting amplitude, frequency and phase of each of the so-obtained simulated multiple sections to each corresponding zero offset section of step b) to generate an ensemble of adjusted multiple sections having amplitude, frequency and phase compatible with the registered multiple reflection;
   e) from each section of the ensemble of the zero-offset sections of b), subtracting the corresponding adjusted multiple section of d), obtaining an ensemble of multiple-free sections.

2. A method for the suppression of multiple reflections from a marine seismic data set having registered primary and multiple reflections, comprising:
   a) sorting said input data set to obtain an ensemble of common offset sections;
   b) transforming each of said common-offset sections into a zero offset section, obtaining an ensemble of zero-offset sections;
   c) stacking a sorted subset of the ensemble of zero offset sections of step b) to generate a single pseudo zero offset section;
   d) using said single pseudo zero offset section as input to the Kirchhoff algorithm for simulation of multiple reflections to generate a single simulated multiple section;
   e) by filtering, adjusting the amplitude, frequency and phase of the so-generated single simulated multiple section of d) to each section of the zero offset sections ensemble of step b) to generate an ensemble of adjusted multiple sections;
   f) from each section of the ensemble of the zero-offset sections of b), subtracting the corresponding adjusted multiple section of e) to obtain an ensemble of multiple-free sections.

3. A method for the suppression of multiple reflections from a marine seismic data set having registered primary and multiple reflections comprising:
   a) sorting said input data set to obtain an ensemble of common offset sections;
   b) transforming each of said common-offset section into a zero offset section to obtain an ensemble of zero-offset sections;
   c) from said ensemble of zero offset sections, sorting the first zero-offset section;
   d) using said first zero offset section as input to the Kirchhoff algorithm for simulation of multiple reflections to generate a simulated multiple section;
   e) by filtering, adjusting the amplitude, frequency and phase of the so-generated simulated multiple section to the first zero offset section to generate the adjusted multiple section corresponding to the first common offset section, said adjusted multiple section playing the role of simulated multiple section for the following, second common offset section, and successively to all sorted common offset sections;
   f) from each of the zero offset sections of b), subtracting the corresponding adjusted multiple section of d) to obtain the corresponding multiple-free section.

4. A method for the suppression of multiple reflections from a marine seismic data set having registered primary and multiple comprising:
   a) applying a proper zero offset transformation and stacking the obtained data to generate a single pseudo zero offset section;
   b) using the so-generated single pseudo zero offset section as an input to the Kirchhoff method for multiple simulation, obtaining a zero offset simulated multiple section;

c) filtering, adjusting amplitude, frequency and phase of the so-obtained zero offset simulated multiple section to generate an adjusted multiple section with amplitude, frequency and phase compatible with the registered multiple reflections;

d) from the single pseudo zero-offset section of a), subtracting the corresponding adjusted multiple section of c), to obtain a multiple-free zero offset section.

5. A method according to claim 1, wherein the transformation to zero offset is performed by applying NMO correction.

6. A method according to claim 1, wherein the transformation to zero offset is performed by applying NMO correction followed by a DMO correction.

7. A method according to claim 1, wherein the transformation to zero offset is performed by applying MZO (Migration to Zero Offset) processes.

8. A method according to claim 1, wherein further an inverse zero-offset transformation is applied to the obtained multiple-free section.

9. A method according to claim 8, wherein the inverse zero-offset transformation is performed by applying an inverse NMO correction.

10. A method according to claim 8, wherein the inverse zero-offset transformation is performed by applying an inverse NMO correction followed by a DMO correction.

11. A method according to claim 8, wherein the inverse zero-offset transformation is performed by applying inverse MZO (Migration to Zero-Offset) processes.

12. A method according to claim 1, wherein the Kirchhoff multiple simulation is performed in one step.

13. A method according to claim 12, wherein the Kirchhoff multiple simulation in one step comprises a summation of figures collected on input data along a stacking line.

14. A method according to claim 1, wherein the Kirchhoff multiple simulation is performed in two steps.

15. A method according to claim 14, wherein the Kirchhoff multiple simulation performed in two steps comprises:
i) migrating input data to depth domain so as to obtain a migrated section and ii) demigrating the so-obtained migrated section using the multiple demigrating approach.

16. A method according to claim 1, wherein filtering is performed by using a single matching filter for the whole section.

17. A method according to claim 1, wherein filtering is performed by using a set of matching filters, each filter being applied to a portion of the adjusted multiple section.

18. A method according to claim 1, wherein filtering and subtraction are performed at the same step using a single matching filter for the whole section.

19. A method according to claim 1, wherein filtering and subtraction are performed at the same step using a set of matching filters, each filter being applied to a portion of the adjusted multiple section.

* * * * *